Patented Jan. 6, 1948

2,434,050

UNITED STATES PATENT OFFICE 2,434,050

TRACTOR-TRAILER BRAKE SYSTEM

Earl R. Price, South Bend, Ind., assignor to Bendix Aviation Corporation, South Bend, Ind., a corporation of Delaware Application December 21, 1945, Serial No. 636,319

6 Claims. (Cl. 188—3)

1

This invention relates to tractor-trailer braking systems, and particularly to those parts of such systems which control the relative pressures applying the tractor and trailer brakes.

In my application Serial No. 549,967, filed August 18, 1944, now Patent Number 2,429,196, issued October 14, 1947, I disclosed a tractor-trailer brake control system which included means for causing an "advance" of the trailer brakes with respect to the tractor brakes. In general, the reasons for providing an advance application of the trailer brakes are to (1) reduce the jolt at the kingpin caused by the trailer riding up on the tractor, and (2) to tend to eliminate the phenomenon known as "jack-knifing," when caused by applying the tractor brakes in advance of the trailer brakes.

As in my previously filed application, the primary object of the present invention is to provide means for increasing the pressure differential at the trailer power brake applying device above its normal value during the early part of the brake application, without incurring an excessive disparity between tractor and trailer pressure differentials during the latter part of the brake application.

In the present case, as well as in the previous application, the objects of the invention are obtained by means of a single valve structure which is so constructed and arranged as to serve both as a "relay" valve and as an "advance" valve for the trailer brakes.

A disadvantage of my earlier device resulted from the fact that the mechanism for advancing the trailer brake application relied upon the vacuum present in the vacuum reservoir of the trailer. The arrangement was such that a diaphragm in the combined relay and advance valve which was responsible for causing the trailer advance was subjected on one side to a pressure derived from the "constant" vacuum chamber and on the other side to the pressure prevailing in the control chamber connected to the trailer power device. Since trailer power devices are conventionally of the atmosphere-suspended type, when the trailer power device of my earlier system was first actuated there was a sudden influx of air to the vacuum reservoir of the trailer, causing a drop in the vacuum available on the trailer. This drop usually amounted to a change from a vacuum of approximately 20 inches of mercury to a vacuum of approximately 16 inches of mercury immediately after the application of the trailer brakes. Inasmuch as the pressure at one side of the "advance" diaphragm in the com-

2 bined relay and advance valve depended upon the vacuum of the trailer reservoir, the slight variation in trailer vacuum injected a certain element of uncertainty into the operation of the trailer advance mechanism. Although an advance was obtained, the exact extent of it depended upon the reduction of vacuum in the trailer reservoir; and an additional undesired effect was the tendency of the advance mechanism of the valve to "hunt."

An object of the present invention is to eliminate entirely this deficiency of the earlier device, and to provide a trailer brake advancing device which will be fully reliable and predictable, and will be capable of smooth control.

Yet another object of the present invention is to provide an arrangement of the type described which will be more positive in its operation than similar devices previously disclosed.

Other objects and advantages of the invention will become apparent in the course of the following description, reference being had therein to the accompanying drawings, in which:

Figure 4 is a close-up showing the arrangement of the operator operated electrical control switch of Figure 1.

Figure 1:
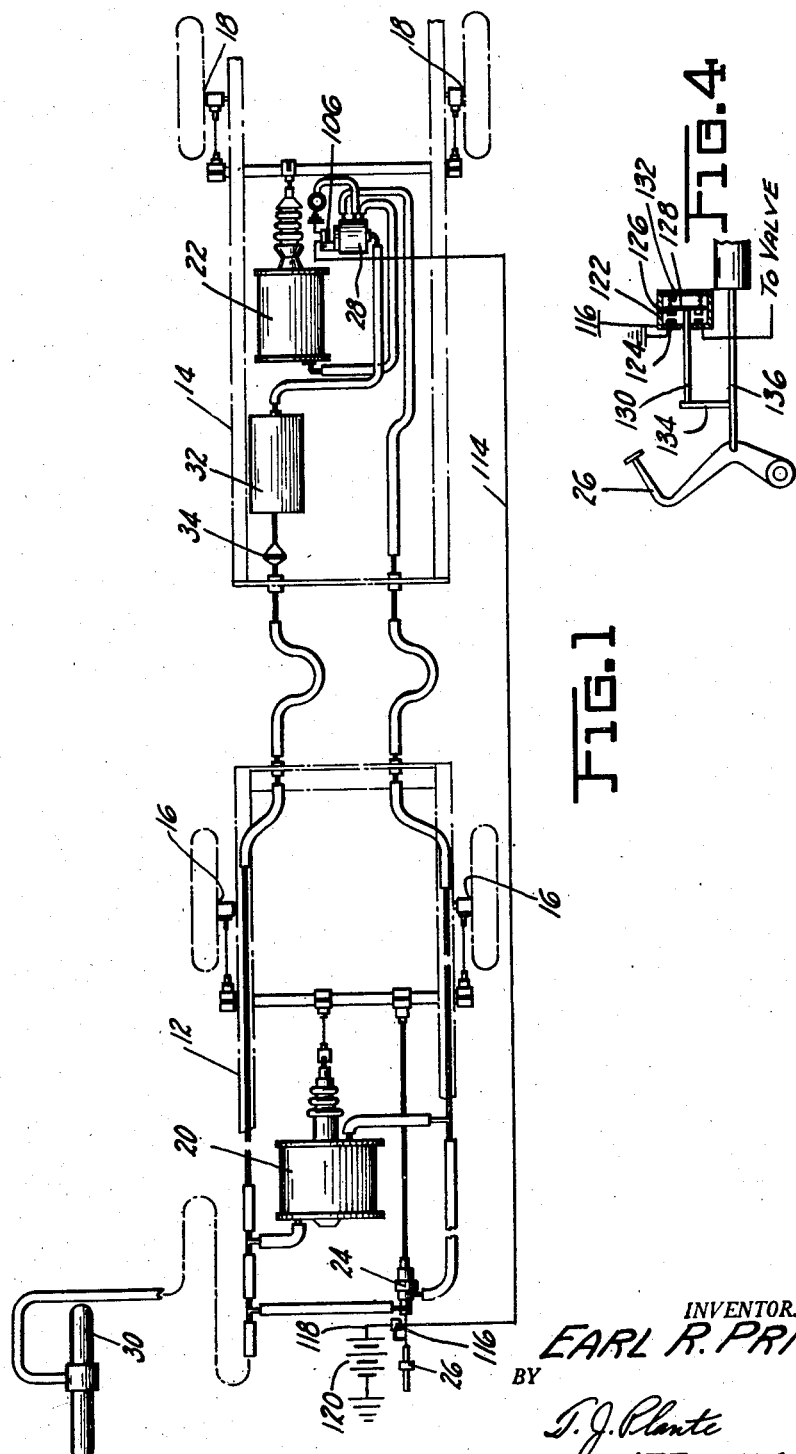
Figure 1 is a diagrammatic showing of a tractor-trailer brake hookup, wherein my invention is utilized.

Referring to Figure 1, a tractor is diagrammatically indicated at 12 and a trailer at 14. The tractor is provided with a plurality of braked wheels 16, two of which are shown in the drawing, and the trailer is provided with a pair of braked wheels 18. The tractor brakes may be applied by means of a power device 20 and the trailer brakes may be applied by the power device 22.

In the conventional tractor-trailer power braking system, the power devices are usually of the differential air pressure type, either compressed air acting against air at atmospheric pressure or air at atmospheric pressure acting against vacuum, the usual vacuum source being the intake manifold. However, the principles of my invention are generally applicable to all tractor-trailer brake arrangements which incorporate a relay valve, regardless of the source of power.

For purposes of illustration, I have chosen a conventional tractor-trailer power brake system of the vacuum type. Vacuum cylinders may be of two types, i. e., those in which the piston or diaphragm is vacuum submerged while the brakes remain released, and those in which the piston or diaphragm is submerged in air at atmospheric pressure while the brakes remain released. In the illustrated system, which shows a conventional hookup, the tractor power cylinder 20 is vacuum suspended, while the trailer power cylinder 22 is atmosphere suspended. It will be obvious that the principles of my invention are not limited to this particular arrangement, since they are equally applicable to any other combination of vacuum suspended and atmosphere suspended power cylinders.

Referring again to Figure 1, a control valve 24 on the tractor may be actuated according to the manipulation of a pedal 26, and this control valve 24 may be connected by means of suitable conduits to a relay valve device 28 on the trailer, and to the control chamber of tractor power cylinder 20. Control valve 24 has one port connected to the intake manifold 30 and another port open to atmosphere. One side of the tractor power cylinder 20 is in permanent communication with the vacuum source (intake manifold 30). Preferably a vacuum reserve tank 32 is mounted on the trailer and is connected to the vacuum source, a check valve 34 being provided to prevent the destruction of the reserve tank vacuum due to a temporary destruction of vacuum at the vacuum source or a permanent destruction caused by a breakaway. The vacuum reserve tank 32 is connected to one port of relay valve 28, and another port of said valve is connected to one side of trailer power cylinder 22, the other side of said power cylinder being open to atmosphere.

Figure 2:
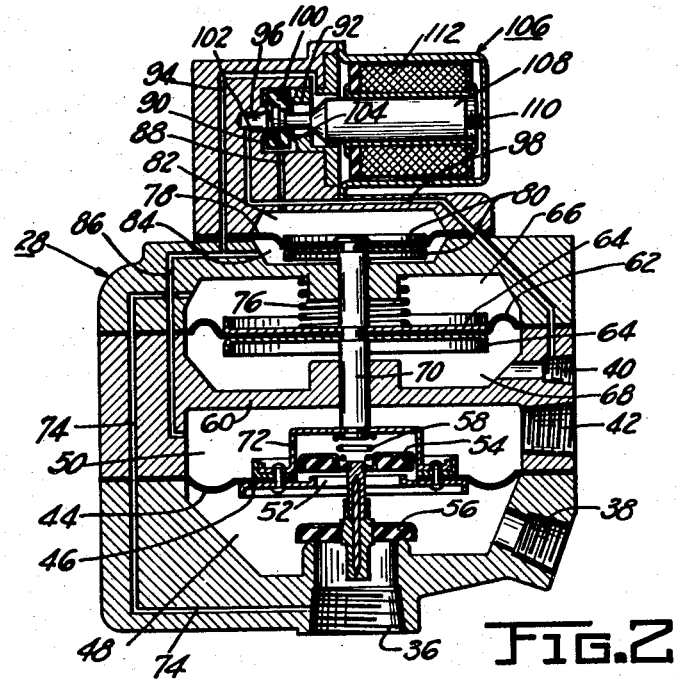
Figure 2 is a section showing the construction of the valve means which is incorporated in Figure 1 to make possible the advantages of my invention, said valve means being shown in the released position.

Referring to Figure 2 for a disclosure of the structure of relay valve 28, the port which is connected to the vacuum reserve tank is shown at 36, the port which is connected to trailer power cylinder 22 is shown at 38, and the port which is connected to control valve 24 is shown at 40. A fourth port 42 is open to atmosphere, preferably through the usual air cleaner.

The valve mechanism shown is usually termed a "relay conversion valve," since it is connected between a control line which is normally (i. e., while the brakes are released) in communication with a source of vacuum, and a trailer power cylinder which is normally submerged in air at atmospheric pressure. The valve structure shown in Figure 2 is adapted to perform the usual relay conversion valve function, plus an additional function which is the primary purpose of the present invention.

A pressure responsive member, constituted by a diaphragm 44 and a plate 46 secured thereto, divides the lower portion of the valve body into two chambers 48 and 50. Atmosphere port 42 opens into chamber 50, and therefore chamber 50 at all times contains air at atmospheric pressure. Chamber 48 has three ports, one of which is port 38, connected to the trailer power cylinder. The other two are the atmosphere port 52 and the vacuum port 36, the atmosphere port 52 opening into chamber 50. A pair of interconnected poppets 54 and 56 are arranged to control the ports 52 and 36 respectively. In the position shown, poppet 56 is seated to close vacuum port 36, while poppet 54 remains away from its seat to maintain chamber 48 and the control chamber of trailer power cylinder 22 at atmospheric pressure.

A light spring 58 urges poppet 54 toward its seat.

Above the wall 60 at the center of the valve body, another pressure responsive device, constituted by a diaphragm 62 and pair of plates 64 secured thereto, separates chambers 66 and 68. The assembly comprising diaphragm 62 and plates 64 is clamped to a vertically movable rod 70, which is also secured by means of cup-shaped member 72 to the assembly which comprises diaphragm 44 and plate 46. Thus the two diaphragm assemblies are caused to move upwardly or downwardly together. Chamber 66 is connected by means of a passage 74 with the vacuum port 36, and therefore said chamber 66 is at all times maintained at vacuum pressure. Chamber 68 is connected by means of control port 40 to the conduit which leads to the control valve on the tractor. A spring 76 urges the rod and the two diaphragm assemblies downwardly, and thereby insures the opening of port 52 in released position, poppet 54 being held away from its seat by means of its connection with poppet 56, which is seated. Since the pressure in chamber 48 is atmospheric, while that at port 36 is vacuum, there is a pressure differential acting on the poppet 56 tending to keep it seated.

The system thus far described operates according to conventional principles. When the operator depresses pedal 26, the vacuum port of control valve 24 is closed and the atmosphere port is opened, thus permitting air to move to the control chamber of tractor power cylinder 20, creating a pressure differential over the piston or diaphragm therein. At the same time air passes through the control line to port 40 and chamber 68 of relay valve 28. This creates a pressure differential over diaphragm assembly 62 tending to move it and rod 70 upwardly, thereby first seating poppet 54 to cut chamber 48 off from the atmosphere, and subsequently opening poppet 56 to connect chamber 48 to vacuum. This begins the evacuation of the air at one side of the piston or diaphragm in trailer power cylinder 22, thereby creating a pressure differential over said piston or diaphragm. As the pressure condition in chamber 48 changes from full atmospheric pressure to a pressure somewhat less, a pressure differential is developed over diaphragm assembly 44 tending to move it and therefore rod 70 downwardly. This pressure tends to counteract the pressure over diaphragm assembly 62. When the pressures on the two diaphragm assemblies balance, the valve moves to lapped or holding position, in which both poppets are closed.

When the pressure on control valve 24 is released by the operator, the air in chamber 68 is evacuated, thus permitting the pressure on diaphragm 44 to overcome the pressure on diaphragm 62 and return the poppets 54 and 56 to their initial position, releasing the trailer power cylinder. The power ratio between tractor and trailer power cylinders depends primarily upon the effective areas of the diaphragm assemblies 62 and 44. In other words, if the effective area of one diaphragm is appreciably larger than the other, a lower pressure differential over the larger diaphragm will balance a higher differential over the smaller diaphragm, and consequently the unit pressure differentials acting on the tractor and trailer power cylinders will be unequal. For example, if the maximum pressure differential is based on a vacuum equivalent to 20 inches of mercury, the full 20-inch differential may be present in one power cylinder at the same time that a smaller differential, such as 17 or 18 inches, is present in the other power cylinder. It will be noted that, in the illustrated valve, the effective area of diaphragm 62 is slightly greater than that of diaphragm 44. While the relationship of areas of the diaphragms is, of course, a matter of choice, I prefer the arrangement shown because the difference in effective areas is such as to provide a maximum differential in one power cylinder when there is a maximum differential in the other power cylinder. In other words, the two power cylinders will "run out" or attain full application together. This requires that the areas of the diaphragms be slightly different because of the fact that the relay valve resistance must be overcome. Thus, in the preferred arrangement, at the maximum pressure differential, the force acting on diaphragm 62 is equal to the opposing force acting on diaphragm 44 plus the force of spring 76 and any other reasistance inherent in the relay valve structure. The effective area of each diaphragm is determined by adding the area of its reinforcing plate and half the area of the portion of the diaphragm between the periphery of the plate and the casing, diaphragm 62, in the illustration, being provided with reinforcing plates 64 which are slightly larger in diameter than the plate 46 of diaphragm 44.

Due to the pressure of spring 76, and the pressure acting to hold poppet 56 on its seat, there is a resistance to actuation of relay valve 28 which tends to prevent the initial development of a pressure differential at the trailer power cylinder. I have provided means for obtaining a pressure differential at the trailer power cylinder as soon as or slightly before a pressure differential is obtained at the tractor power cylinder, thus increasing the trailer differential above its normal value during the early stages of the brake application. I prefer to provide for a gradual diminution of the trailer "advance" as the brake application is progressively intensified, until, at the point of valve "run out" the total available pressure differential is present in both tractor and trailer power cylinders. This latter feature is particularly desirable because the effect of the relay valve resistance is much more noticeable when the pressure differentials are low than when they are high. In other words, the additional diaphragm area necessary to counteract the effect of the valve resistance at a low differential is large, whereas, if the pressure differential increases, the required additional diaphragm area decreases, due to the higher working pressure.

Figure 3:
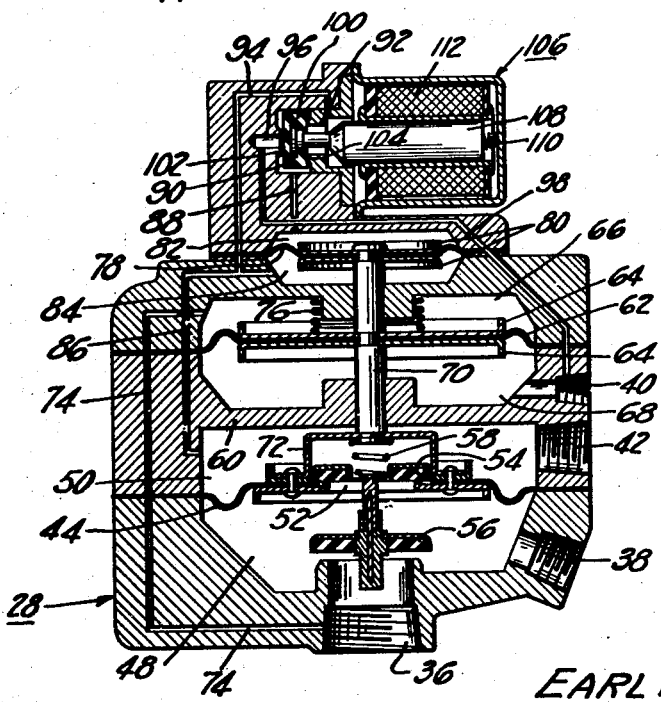
Figure 3 is a section showing the valve means of Figure 2 in applied position.

Referring to Figures 2 and 3, an additional pressure responsive member, consisting of diaphragm 78 and plates 80 associated therewith, is secured to rod 70, the diaphragm assembly separating chamber 82 from chamber 84. Chamber 84 is connected by means of passage 86 with chamber 50 of the valve, and therefore air at atmospheric pressure is constantly present in chamber 84. Chamber 82 is connected by means of a passage 88 with a small chamber 90 formed in the body of the valve. Located at one side of chamber 90 is a port 92 which is connected by means of passage 94 with passage 86. At the opposite side of chamber 90 is a port 96 which is connected by means of passage 98 with the control port 40. Located within chamber 90 is a valve element 100 which is adapted alternatively to seat at 102 and thereby cut off passage 98 from the interior of chamber 90, or to seat at 104 and thus cut off passage 94 from the interior of chamber 90. In the release position, as shown, valve element 100 is seated at 102 to close port 96, while permitting communication between passages 94 and 88, thereby maintaining air at atmospheric pressure in chamber 82.

Operation of valve element 100 is under the control of a solenoid 106. The armature 108 of the solenoid is directly connected to the valve element to control the movements thereof. A light spring 110 normally retains the solenoid armature in the leftward position, as shown. When the coil 112 is energized it causes the armature 108 to move toward the right, until valve element 100 comes into contact with valve seat 104.

The electrical circuit which controls solenoid 106 is illustrated in Figure 1 as being grounded in the solenoid and having a conductor 114 leading from the other terminal of the solenoid to a control switch 116 located on the tractor vehicle and under the control of the operator. A wire 118 leads from the control switch through a battery 120 to ground. The particular mechanism of the control switch 116 is not important, inasmuch as the only requirement is that the switch be under the control of the operator and be arranged to close at the proper time to provide the initial application of brakes on the trailer. For purposes of illustration, I have shown in Figure 4 a switch having a casing 122 suitably carried by the vehicle frame, and having one set of contacts 124 supported on the casing and a second set of contacts 126 provided on a movable member 128 which has a stem 130, and which is urged toward contact making position by a spring 132 compressed between member 128 and casing 122. So long as the pedal 26 remains in released position, a projecting member 134 carried by rod 136 acts against stem 130 to hold contact points 126 away from contact points 124, thereby holding the switch open. When the operator moves the pedal in the direction to apply the brakes, rod 136 moves toward the left, and projecting member 134 moves with it, thereby permitting spring 132 to close the switch.

It will be obvious that, if hydraulic brakes are used on the tractor, a conventional pressure operated stop light switch can be utilized to control the solenoid 106.

Operation of the mechanism for obtaining an "advance" of the trailer brakes is as follows, the mechanism being illustrated in released position in Figure 2, and in applied position in Figure 3:

As soon as the control switch 116 is closed by manipulation of pedal 26, solenoid 106 is energized, causing armature 108 to move toward the right bringing valve element 100 into contact with valve seat 104, to cut off communication between passage 94 and chamber 82 and at the same time opens communication between passage 98 and chamber 82. Because passage 98 is connected to control port 40, and because the control line which is connected to the port 40 is maintained at vacuum pressure so long as the tractor power device is released, the opening of chamber 82 to passage 98 will cause an almost instantaneous evacuation of air from the chamber 82, with the result that a pressure differential will be developed over diaphragm 78 tending to raise rod 70, thereby developing a force tending to lift poppet 56 and to create a pressure differential in the trailer power cylinder. Since the full differential is immediately effective over diaphragm 78, the total force exerted by the diaphragm depends upon its effective area. This may be any chosen value depending upon the pressure differential which it is desired to have in the trailer power cylinder during the early stages of brake application. The force of diaphragm 78 acting on rod 70 makes it possible to overcome quickly the resistance of spring 76 and the pressure over poppet 56 in the relay valve, and thereby attain a higher differential at the trailer power cylinder than would otherwise develop during the early stages of brake application.

As the pressure differential in the tractor power cylinder increases, there will be a concurrent increase of pressure at control port 40, thus gradually destroying the vacuum in chamber 82, as well as in chamber 68. As the pressure in chamber 82 increases, the effectiveness of diaphragm 78 is reduced, until, when full pressure is developed in the tractor power cylinder, air at atmospheric pressure will have filled chamber 82, and there will no longer be a pressure differential over diaphragm 78. It will be obvious from this description that the additional diaphragm or pressure responsive member 78 has its maximum effect in the early stages of brake application and gradually decreases in effectiveness as the brake applying pressures are built up until it becomes entirely neutralized as full brake application is obtained. This arrangement is ideal because it enables the trailer power cylinder to develop an initial pressure without requiring the build up of an appreciable pressure differential in the tractor power device, and at the same time the present arrangement permits the tractor and trailer power cylinders to obtain maximum application substantially simultaneously.

Because the control of chamber 82 is accomplished by the pressure prevailing at control port 40, the difficulties experienced with my previous advance valve are entirely obviated. Once the air has been evacuated from chamber 82, there is no sudden change in the pressure of said chamber, and the result is a smoothly graduated diminution of the pressure differential over diaphragm 78.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a tractor-trailer brake system having a differential pressure power device for operating the trailer brakes, a differential pressure power device for operating the tractor brakes, a relay valve controlling the trailer power device, a control valve which regulates both the tractor power device and the relay valve, and an operator operated member which actuates the control valve; in combination, a pressure-responsive member arranged when urged in one direction to cause an increase of the pressure differential in the trailer power device, a passage connecting one side of said pressure-responsive member to a constant pressure source, a normally closed passage adapted when open to connect the other side of said pressure-responsive member to a given pressure, and a valve element automatically operated almost immediately after the operator operated member is actuated to open the last-named passage.

2. Valve means having relay and advance functions comprising a valve member adapted to be moved in one direction to cause a power increase in a controlled motor and in the opposite direction to cause a power decrease in said motor, pressure-responsive means associated with said valve member and balanced between the pressure prevailing in a control line and the pressure prevailing in the controlled motor, an additional pressure-responsive member normally balanced between substantially equal pressures, one side of said additional pressure-responsive member being acted on by the pressure prevailing in a contant pressure source, and a valve element arranged either to connect the other side of said additional pressure-responsive member to the aforesaid constant pressure source or to connect said other side to the aforementioned control line.

3. Valve mechanism for a vacuum power brake system comprising a first valve member controlling a vacuum port, a second valve member controlling an atmosphere port, a control rod movable in the first direction to first cause closing of the atmospheric port and subsequently cause opening of the vacuum port and in the second or opposite direction to first cause closing of the vacuum port and subsequently cause opening of the atmosphere port, a diaphragm connected to the rod and forming chambers on opposite sides thereof, one of which is open to the atmosphere and the other of which is in communication with a controlled motor, the arrangement being such that a decrease of absolute pressure in the latter chamber increases the available power in the controlled motor and also increases the pressure differential over the diaphragm urging the control rod in the second direction, a second diaphragm connected to the rod and forming chambers on opposite sides thereof, one of which is open to a vacuum source and the other of which is open to communication with a control line which normally is at vacuum pressure, the arrangement of said second diaphragm being such that an increase in the absolute pressure of the control line increasingly urges the control rod in the first direction, a third diaphragm connected to the rod and forming chambers on opposite sides thereof which are normally under substantially the same pressure conditions, one of said chambers being open to the atmosphere, a first passage which when open connects the other side of said third diaphragm to the atmosphere, a second passage which when open connects said other side of said third diaphragm to the aforementioned control line, a valve element arranged normally to close the second passage while allowing the first passage to remain open, and a solenoid which when energized moves the valve element to a position in which the first passage is closed and the second passage is open.

4. Valve mechanism for a vacuum power brake system comprising a first valve member controlling a vacuum port, a second valve member controlling an atmosphere port, a control rod movable in the first direction to first cause closing of the atmospheric port and subsequently cause opening of the vacuum port and in the second or opposite direction to first cause closing of the vacuum port and subsequently cause opening of the atmosphere port, a diaphragm connected to the rod and forming chambers on opposite sides thereof, one of which is open to the atmosphere and the other of which is in communication with a controlled motor, the arrangement being such that a decrease of absolute pressure in the latter chamber increases the available power in the controlled motor and also increases the pressure differential over the diaphragm urging the control rod in the second direction, a second diaphragm connected to the rod and forming chambers on opposite sides thereof one of which is open to a vacuum source and the other of which is open to communication with a control line which normally is at vacuum pressure, the arrangement of said second diaphragm being such that an increase in the absolute pressure of the control line increasingly urges the control rod in the first direction, a third diaphragm connected to the rod and forming chambers on opposite sides thereof which are normally under substantially the same pressure conditions, one of said chambers being open to the atmosphere, a first passage which when open connects the other side of said third diaphragm to the atmosphere, a second passage which when open connects said other side of said third diaphragm to the aforementioned control line, a valve element arranged normally to close the second passage while allowing the first passage to remain open, and means capable of moving said valve element to a position in which the first passage is closed and the second passage is open.

5. Valve mechanism for a vacuum power brake system comprising a first valve member controlling a vacuum port, a second valve member controlling an atmosphere port, a control rod movable in the first direction to first cause closing of the atmosphere port and subsequently cause opening of the vacuum port and in the second or opposite direction to first cause closing of the vacuum port and subsequently cause opening of the atmosphere port, a diaphragm connected to the rod and forming chambers on opposite sides thereof, one of which is open to the atmosphere and the other of which is in communication with a controlled motor, the arrangement being such that a decrease of absolute pressure in the latter chamber increases the available power in the controlled motor and also increases the pressure differential over the diaphragm urging the control rod in the second direction, a second diaphragm connected to the rod and forming chambers on opposite sides thereof, one of which is open to a vacuum source and the other of which is open to communication with a control line which normally is at vacuum pressure, the arrangement of said second diaphragm being such that an increase in the absolute pressure of the control line increasingly urges the control rod in the first direction, a third diaphragm connected to the rod and forming chambers on opposite sides thereof which are normally under substantially the same pressure conditions, one of said chambers being open to the atmosphere, a first passage which when open connects the other side of said third diaphragm to the atmosphere, a second passage which when open connects said other side of said third diaphragm to the aforementioned control line, and valve means controlling communication between said other chamber formed by said third diaphragm on the one hand, and the first and second passages on the other hand.

6. Valve means having relay and advance functions comprising a control element adapted to be moved in one direction to cause a power increase in a controlled motor, and in the opposite direction to cause a power decrease in said motor, pressure responsive means associated with said control element and arranged to tend to move said element in the first direction as the pressure in a control line changes from that prevailing during release to that prevailing during actuation and to tend to move the element in the other direction as the power in the controlled motor increases, said tendencies being balanced against one another, an additional pressure responsive member also associated with said control element and subjected on one side to a constant pressure and on the other side either to said constant pressure or to the pressure prevailing in the aforementioned control line, and a valve member adapted to selectively permit communication of said other side of said additional pressure responsive member either with the constant pressure or the control line, said additional pressure responsive member tending to move the aforementioned control element in a direction to cause a power increase in the controlled motor whenever the valve member causes said other side of said additional pressure responsive member to communicate with the control line.

EARL R. PRICE.

REFERENCES CITED

The following references are of record in the file of this patent:

FOREIGN PATENTS

| Number | Country | Date |
|---|---|---|
| 385,163 | Great Britain | Dec. 22, 1932 |
| 512,436 | Great Britain | Sept. 15, 1939 |